(No Model.)

F. H. ALLEN.
FERTILIZER DISTRIBUTER.

No. 412,061. Patented Oct. 1, 1889.

Witnesses:

Inventor:
Frank H. Allen.
By W. R. Stringfellow
Attorney.

UNITED STATES PATENT OFFICE.

FRANK H. ALLEN, OF PORT ALLEN, LOUISIANA.

FERTILIZER-DISTRIBUTER.

SPECIFICATION forming part of Letters Patent No. 412,061, dated October 1, 1889.

Application filed May 28, 1889. Serial No. 312,461. (No model.)

*To all whom it may concern:*

Be it known that I, FRANK HOWAR ALLEN, a citizen of the United States, residing at Port Allen, in the parish of West Baton Rouge and State of Louisiana, have invented certain new and useful Improvements in Fertilizer-Distributers; and I do declare the following to be a full, clear, and exact description of the invention, such as will enable others skilled in the art to which it appertains to make and use the same.

My invention relates to an improvement in a fertilizer-distributer in which a propeller placed within a hopper on a two-wheeled cart is made to operate in conjunction with blades and gearing; and the objects of my improvements are to provide a device for distributing guano, cotton-seed meal, or other ground fertilizer. I attain these objects by the mechanism illustrated in the accompanying drawings, in which—

Figure 1:
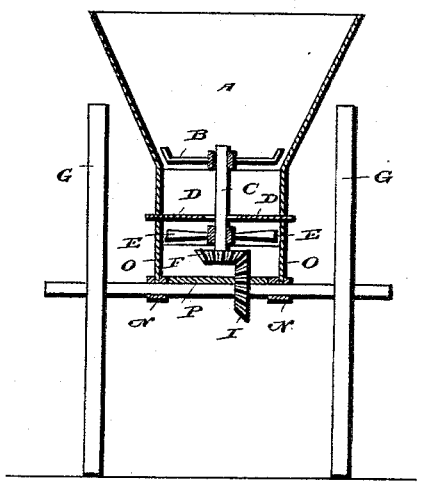
Figure 3:
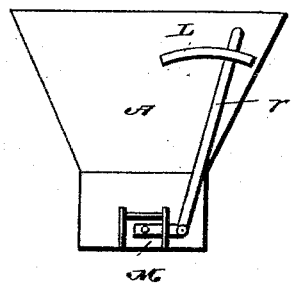
Figure 2:
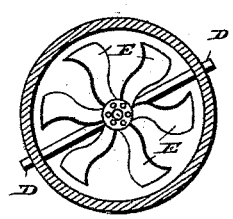
Figure 4:
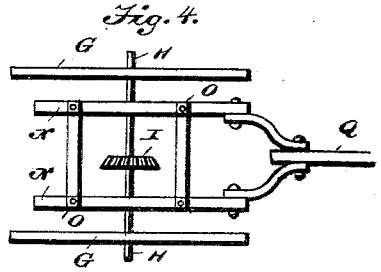
Figure 5:

Figure 1 is a sectional view. Fig. 2 is a top view of propeller-blade. Fig. 3 is an end view. Fig. 4 is a top view of frame upon which hopper rests. Fig. 5 is a side view of a propeller-blade.

Similar letters refer to similar parts throughout the several views.

In constructing my invention I form a hopper, as shown by A, with agitator-arms placed on shaft within hopper, as designated by B, C being a shaft.

D are stationary bladed arms, resting just above rotating blades of propeller-like form E.

F is a spur-wheel adjusted on shaft C.

G are wheels of cart.

H is an axle; I, a spur-wheel on axle.

K is a lever for opening door M; L, a ratchet which holds lever K in any desired position.

N are side pieces, upon which hopper A rests.

O are arms.

P are cross-pieces; Q, a tongue.

In practice the fertilizer is placed within hopper A. The wheels G are rotated by means of animals attached to tongue Q. The axle H, which is in a fixed position within hubs of wheels G, also rotates, and by means of the rotation of spur-wheel I, attached to said axle, movement is given to spur-wheel E, attached to shaft C, and which rotates propeller-blades E and agitating-arms B. Motion being thus given, the guano, cotton-seed meal, or other pulverized fertilizer placed within hopper is agitated by arms B, descends upon blades E, which rotate, and all lumpy substances falling upon blades E are thrown in contact with blade-arms D and crushed, thereby causing a thorough pulverizing, and the fertilizer by action of blades E is thrown from the hopper through door M, where it may pass downward through drills or in a broadcast manner.

Having fully described my invention, what I claim, and desire to secure by Letters Patent, is—

In a fertilizer-distributer, the combination, with the axle and gear thereon, of the hopper, the vertical shaft arranged therein, the bevel-gear on the lower end of the shaft, adapted to engage the gear on the axle, the agitator-arms B, secured to the upper ends of the shaft, the arms D, secured to the walls of the hopper on the inner sides thereof, and the curved and outwardly-flaring radially-disposed blades E, having their opposite edges arranged above and below a horizontal line on the vertical shaft, substantially as specified.

In testimony whereof I affix my signature in presence of two witnesses.

FRANK H. ALLEN.

Witnesses:
HELMUTH HOLTZ,
PERCY D. PARKS.